(12) United States Patent
Koryakin et al.

(10) Patent No.: US 10,204,220 B1
(45) Date of Patent: *Feb. 12, 2019

(54) THIN HYPERVISOR FOR NATIVE EXECUTION OF UNSAFE CODE

(71) Applicant: Parallels IP Holdings GmbH, Schaffhausen (CH)

(72) Inventors: Alexey B. Koryakin, Moscow (RU); Andrey N. Naenko, Moscow (RU); Nikolay N. Dobrovolskiy, Moscow (RU); Stanislav S. Protassov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 312 days.

This patent is subject to a terminal disclaimer.

(21) Appl. No.: 15/053,475

(22) Filed: Feb. 25, 2016

Related U.S. Application Data (63) Continuation of application No. 14/582,713, filed on Dec. 24, 2014, now Pat. No. 9,274,823.

(51) Int. Cl.
*G06F 21/53* (2013.01)
*G06F 9/455* (2018.01)

(52) U.S. Cl.
CPC .......... *G06F 21/53* (2013.01); *G06F 9/45545* (2013.01); *G06F 9/45558* (2013.01); *G06F 2221/033* (2013.01)

(58) Field of Classification Search
CPC ............. H04L 63/1416; H04L 63/1408; H04L 63/1441; H04L 63/1458; G06F 21/552; G06F 9/45587; G06F 9/45558
See application file for complete search history.

(56) References Cited

U.S. PATENT DOCUMENTS

| | | | | |
|---|---|---|---|---|
| 7,047,394 B1* | 5/2006 | Van Dyke | ........... | G06F 9/30167 703/26 |
| 7,647,589 B1* | 1/2010 | Dobrovolskiy | ..... | G06F 11/3644 710/260 |
| 8,176,336 B1* | 5/2012 | Mao | ........................ | H04L 9/006 713/189 |
| 8,347,302 B1* | 1/2013 | Vincent | ................. | G06F 9/4881 718/103 |
| 9,274,823 B1* | 3/2016 | Koryakin | ............ | G06F 9/45558 |
| 9,361,145 B1* | 6/2016 | Wilson | ................ | G06F 9/45558 |

(Continued)

*Primary Examiner* — Farid Homayounmehr
*Assistant Examiner* — Sanchit K Sarker
(74) *Attorney, Agent, or Firm* — Bardmesser Law Group (57) ABSTRACT

A system, method and computer program product for implementing a thin hypervisor. The thin hypervisor does not have any direct association with a VM. The thin hypervisor serves as a wrapper over hardware capabilities of a processor. The processor has privileged low-level capabilities EPT VTX, AMD V and the ARM has virtualization technology. In order to use processor hardware capabilities and receiving root privileges, the system operates in a "super user" mode. The VM operates in a VM environment with kernel privileges in a user mode. A super user space is created in a safe mode. A user space application (or a process) is created. A user space virtualization framework library is used. These entities may be separated by a user space and a kernel (OS) space. A thin hypervisor is implemented in the user space.

19 Claims, 5 Drawing Sheets

(56) References Cited

U.S. PATENT DOCUMENTS

| | | | |
|---|---|---|---|
| 9,626,509 B1* | 4/2017 | Khalid | G06F 21/53 |
| 2004/0003324 A1* | 1/2004 | Uhlig | G06F 11/0712 |
| | | | 714/38.13 |
| 2004/0123117 A1* | 6/2004 | Berger | H04L 63/1408 |
| | | | 713/188 |
| 2005/0132122 A1* | 6/2005 | Rozas | G06F 21/52 |
| | | | 711/100 |
| 2007/0162726 A1* | 7/2007 | Gschwind | G06F 9/30101 |
| | | | 712/209 |
| 2008/0282241 A1* | 11/2008 | Dong | G06F 9/45533 |
| | | | 718/1 |
| 2009/0172328 A1* | 7/2009 | Sahita | G06F 12/1491 |
| | | | 711/163 |
| 2011/0047544 A1* | 2/2011 | Yehuda | G06F 9/4555 |
| | | | 718/1 |
| 2011/0197190 A1* | 8/2011 | Hattori | G06F 9/30076 |
| | | | 718/1 |
| 2013/0007325 A1* | 1/2013 | Sahita | G06F 13/24 |
| | | | 710/267 |
| 2013/0133061 A1* | 5/2013 | Fainkichen | H04W 76/10 |
| | | | 726/15 |
| 2013/0347131 A1* | 12/2013 | Mooring | G06F 9/45558 |
| | | | 726/29 |
| 2014/0365971 A1* | 12/2014 | Laadan | H04W 4/18 |
| | | | 715/835 |
| 2015/0058444 A1* | 2/2015 | Willmann | H04L 67/18 |
| | | | 709/217 |
| 2015/0156183 A1* | 6/2015 | Beyer | H04L 63/08 |
| | | | 726/4 |
| 2015/0178497 A1* | 6/2015 | Lukacs | G06F 9/461 |
| | | | 726/23 |
| 2015/0312117 A1* | 10/2015 | Behera | H04L 43/04 |
| | | | 370/241 |
| 2016/0292108 A1* | 10/2016 | Konishi | G06F 13/366 |
| 2017/0090963 A1* | 3/2017 | Nakajima | G06F 9/45558 |
| 2017/0277632 A1* | 9/2017 | Moriki | G06F 12/10 |

\* cited by examiner

THIN HYPERVISOR FOR NATIVE EXECUTION OF UNSAFE CODE

CROSS-REFERENCE TO RELATED APPLICATION

This application is a continuation of U.S. patent application Ser. No. 14/582,713, filed on Dec. 24, 2014, which is incorporated by reference herein in its entirety.

BACKGROUND OF THE INVENTION

Field of Invention

The present invention relates to virtualization technology, and, more particularly to a thin hypervisor for native execution of an unsafe code.

Background Art

With Virtual Machine (VM) technology, a user can create and run multiple operating environments on a Host server at the same time. Each Virtual Machine requires its own guest operating system (GOS) and can run applications independently.

Each VM acts as a separate execution environment, which reduces the risk and allows developers to quickly re-create different operating system (OS) configurations or compare versions of applications designed for different OS's for as long as the integrity of data used by each of the VMs is provided. Generally, a Virtual Machine is an environment that is launched on a particular processor (a host) that is running a host operating system (HOS) and the VM runs the Guest OS.

A hypervisor provides a layer between the computing, storage, and networking hardware and the software that runs on it. Using hypervisor-assisted virtualization requires a privileged hypervisor kernel module running on a protected mode ring 0, managing root mode and handling virtual machine control structures (VMCS) for VMs. However, applications sold through Mac App Store, App Store, Google Play, Windows Market are not allowed to have protected mode ring 0 and root privileges and to use personal drivers. These limitations prevent publishing of virtualization applications.

Many users would like to have products that support virtualization to have the benefit of multiple guest OSs running in parallel on the same host computer. The processor privileges for entering into root mode required for hardware assisted virtualization are not allowed by software distribution rules. Applications deployed from online stores (such Mac App Store, App Store, Google Play, Windows Market) run in an isolated environment (so called "sandbox") having very limited system functions access. System API calls are controlled by a host operating system. Only limited standardized API functions calls (frameworks), which are explicitly declared as compatible with sandboxed environment, are allowed in applications deployed from the stores. The applications must be registered and distributed without the drivers and using ring 0 and root privileges.

Accordingly, there is a need in the art for special standardized thin hypervisor for using hardware virtualization capabilities of modern processors with Mac App Store, App Store, Google Play, Windows Market and similar products.

SUMMARY OF THE INVENTION

The present invention is directed to virtualization technology and, more particularly to a system and method for a thin hypervisor for native execution of an unsafe code that substantially obviates one or several of the disadvantages of the related art.

In one aspect, there is provided a system, method and computer program product for implementing a thin hypervisor. The thin hypervisor does not have any association with a VM. The thin hypervisor serves as a wrapper over hardware capabilities of a processor. The processor has privileged low-level capabilities Intel VT-X (including EPT and "unrestricted guests" extensions), AMD-V (including RVI) and the ARM has virtualization technology. Only kernel space code can use processor virtualization capabilities. Applications running in a sandboxed environment cannot have kernel modules. Such applications can access privileged functionality (including kernel space functions) of OS by using formalized and documented API only. Therefore, processor virtualization capabilities are unavailable for using from downloaded applications.

In order to use processor hardware capabilities and receive root privileges, the system operates in a "super user" mode. The VM operates in a VM environment with kernel privileges in a user mode. A super user space is created in a safe mode.

According to the exemplary embodiment, a user space application (or a process) is started. A user space virtualization framework library is used. These entities are separated by a user space and a kernel space. A thin hypervisor is implemented in the kernel space. The virtual execution environment (VEE) is a non-root environment—i.e., a special mode of processor operation that allows unsafe code execution in an isolated environment and gets so called VMExits on unsafe operations, but the isolation is guaranteed within the VM.

Hardware virtualization technology contains virtual machine control structure (VMCS) managing non-root mode for VEE execution and declaring unsafe operations VMExit conditions. A properly created VEE environment is fully isolated environment that code running inside non-root mode cannot access any data and hardware of host OS.

An important aspect is implementing a very small piece of code that is enough to create proper VEE environment to isolate non-trusted guest code. This small piece of kernel level code virtualizes almost nothing, and only performs pass-through all non-trusted guest environment read/write/ set up requests from user space and returns all VMExits to user space without any processing in kernel space. Thus, user space application can create and manipulate guest registers and code state without harming host operating system. A thin hypervisor is intermediate management layer accessed by using simple VEE state read/write user space standardized API. At the same time, the thin hypervisor allows full functioning VMCS and guest registers state access that user space application may prepare any kind of non-trusted guest code and launch it in isolated non-root environment.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the embodiments of the present invention, examples of which are illustrated in the accompanying drawings.

The following definitions are generally used throughout this description:

VEE—Virtual Execution Environment, a type of environment that supports program code execution, where at least a part of the real hardware and software required for running program code are presented as their virtual analogs. From the point of view of the user, the code in VEE runs as if it were running on the real computing system. An example of VEE is a Virtual Machine (VM).

VE—Virtual Environment, for example, a Virtual Private Server (VPS), is one type of a Virtual Execution Environment (VEE) running on the same hardware system with a shared OS kernel and most of the system resources, where isolation of Virtual Execution Environments is implemented on the namespace level.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Hypervisor—controls software, while having the highest privilege level for administrating hardware computer resources and Virtual Machines.

A VEE, according to an exemplary embodiment, can be any of a Virtual Private Server, a Virtual Machine, a Hypervisor-based Virtual Machine, a session of Terminal Server Windows 2003 (or older) and a session of Citrix Presentation Server, VMM-based VMs or hypervisor-based VMs.

Each VM can have several execution contexts with the events that need to be logged. The contexts can be Virtual Machines (VMs) and various applications.

According to the exemplary embodiment, a system, method and computer program product for implementing a thin hypervisor are provided. The thin hypervisor does not need any association with a particular VM. The thin hypervisor serves as a wrapper over hardware capabilities of a processor to provide simple access for user space applications and to filter harmful state modifications of hardware structures (e.g., VMCS). According to the exemplary embodiment, a user space application (or a process) is started. A thin hypervisor is implemented in the kernel space. These entities are separated by a user space and a kernel space. A user space virtualization framework library is used to provide standardized API to hardware virtualization capabilities managed in thin hypervisor. The user space application uses virtualization framework API to manage hardware-assisted virtualization environments. The virtual execution environment is a non-root environment—i.e., a special mode of processor operation that allows a user to perform unsafe operations, but the isolation is guaranteed within the VM.

Virtual Machine Control Structure (VMCS) and Virtual Machine Control Procedure (VMCB) form the unsafe operation exception map when the process needs to exit the isolated non-root mode execution context. Then, VMEXITs are generated. However, the exemplary embodiment can provide a mode where exits from the VM are not executed, and the harmful code is forced to be executed inside the VM, or the execution context ignores the code trying to exit a VM.

The VMCS is divided into three parts—a control part, a host part and a guest part. The thin hypervisor prohibits access to the host part and doesn't provide any interfaces for manipulation of the host part to the user space process. Access to the control part is filtered, and reads and writes to the guest part are allowed. The host part describes a real processor state when it gets the VMEXIT and determines location of the VMEXIT handler. The user space application can create and configure the environments for execution of the unsafe applications and so called guest operating systems. The unsafe code is executed then under protection of the thin hypervisor in a completely isolated context. There are no limitations on executed code and context running in non-root mode, Real Mode, Protected Mode (with its privileged levels divided to user and supervisor/system levels). If an executed instruction is allowed by the VMCS control part, it works natively in isolated environment. Otherwise the execution fails with the VMEXIT, the unsafe code is interrupted, the thin hypervisor processes nothing and simply pushes an exit to the user space for further handling and/or virtualization and/or emulation. Note that the use of hardware capabilities provides for the most native code execution. If an instruction is not allowed in a virtual execution environment, the VMEXIT is generated. Generally, the thin hypervisor does not know about how the VMEXIT should be processed and simply passes it to user space application, because all cases that are prohibited for native execution are handled there. Also, only subscribed applications know how to handle VMEXITs. Thus, keeping host protection, the thin hypervisor provides a way to execute any kind of code in hardware-assisted isolated non-root mode natively, without harming the host OS. The thin hypervisor is very small, but it is enough to pass control between user space application handling all unsafe cases and non-root mode running safe code natively. Parts of the thin hypervisor can be also implemented as microcode without any overhead, analogous to a hardware implementation of VMEXIT directly to user space handler. The configurations can be implemented by VMCS. If installation of kernel space drivers is prohibited (e.g., on some Smartphones), the thin hypervisor allows for extended functionality. For example, the phone is placed into a hibernating state or the phone is turned off inside the VM. The reactivation of the phone can be triggered from the host OS, for example, in a safe mode (and either keeping or losing the VM).

In one embodiment, the host context is safe, but only allows for loading a certain number of applications. The exemplary embodiment can provide a safe context for an extended variety of applications. VMEXITs create considerable overhead. According to the exemplary embodiment, each context has a certain set of functions allowed in this context (including exiting the context). Thus, exit from the context is always safe, and the process switches to a safe context. The context prohibits operations with unsafe registers or reading data from other contexts.

According to another embodiment, the thin hypervisor can provide means for reading and analyzing data within the context for using anti-virus capabilities. Meanwhile, the thin hypervisor prohibits saving data upon exiting the context. In other words, two events are generated—"virus present" and "no virus detected." Then, the presence of a virus can be analyzed by the system at the address of exception generation.

According to the exemplary embodiment, isolated environments for drivers of new devices are created. For example, an isolated environment can be created for isolation of ranges of address spaces allocated for devices. In order to provide safety, super user rights can be granted. This is implemented by a system procedure of the thin hypervisor for using all system components in a safe mode.

According to yet another exemplary embodiment, the memory can be virtualized using nested paging (such as Intel EPT, AMD RVI), which provides translation of the guest physical addresses into host physical addresses. The set of address translation tables of virtual environments with re-mapping of addresses is used. Thus, the contexts can be isolated without physical isolation. In one embodiment, a safe tunnel or a thin hypervisor can be defined by a context identifier or by a table containing available address ranges and allowed operations for certain address ranges, and allowed argument values that can be written into registers and at the context addresses. The thin hypervisor can have synchronous and asynchronous interfaces. The virtual environment context can be launched by passing a request for launching unsafe code from user space context to the hypervisor.

According to the exemplary embodiment, the access to processor hardware functions can be implemented by the same API using different values. For example, different hardware components are mapped at different physical addresses. A hardware access function can be called from a user space application. The driver can pass the function to the kernel space. However, the system checks the argument value or a range of arguments for being allowed. For example, a read/write buffers and a device control buffer can be located in a particular address range. A user may only have permission for the read buffer. Calls for other addresses are declined after a check. This structure, advantageously, simplifies translation of calls and increases performance. Additionally, it protects hardware from intrusions.

According to the exemplary embodiment, a software development kit can use the drivers or part of the OS kernel providing access to hardware-assisted virtualization capabilities. A developer can check for the compatibility of a driver to see if the driver is sufficient to accommodate system functionality. If the use of system calls is not allowed, the functions can be replaced by the ones compatible with the driver or another driver can be used. Distributed applications can have a procedure that determines the installation platform (environment) and calls an appropriate driver. Thus, a virtualized SDK framework can use different drivers for different platforms.

According to one exemplary embodiment, a set of safe tunnels from the user space to the kernel space is implemented on the system kernel. Each of the tunnels is safe for the system and can be used only by a single user. Shared use of the tunnels is prohibited. A set of rules may be taken into consideration before tuning of the tunnels.

Unsafe code running in an isolated non-root mode requires memory access. A responsibility of user-space application is to prepare set of memory page regions and to associate them with ranges of unsafe code physical pages by using the thin hypervisor API. The thin hypervisor tracks the ranges and creates nested paging (EPT, RVI) entries to map the registered regions. Thus, unsafe code accesses memory pages only within the boundaries of mapped regions.

To be mapped, user space memory pages have to be locked or wired by using correspondent host operating system kernel API. Locking pages reserves real physical pages under user space buffer until an unlock operation is performed. The thin hypervisor creates nested paging tables and write physical page addresses to correspondent nested paging table entries. The thin hypervisor can do mapping on demand when unsafe code tries access correspondent page, or it can create full non-root (guest) memory mapping right after user space memory region registration. These behaviors are only examples of how thin hypervisor can do the nested paging structures preparation. Other combined methods are also possible.

Many types of user space virtual address space buffers are allowed. The only requirement is the host OS kernel can make locking operations and get physical pages for the buffer. Pages allocated in pool, memory mapped files, and anonymous mappings can be used as unsafe code memory pages storage.

No implementation of mmap is required—it is required for correct remapping of the guest memory; non-anonymous (plain) mappings can be supported, but do not need to be supported—they are used by VMMs for performance reasons on Linux platforms.

Local storage suffers from automatic cloud syncing and sudden out-of-space removal. The cloud syncing should be disabled for VM files, since transferring memory images over network is not required and will degrade performance. The ability to disable the out-of-space killer for VM files should be available.

Out-of-memory killer should call subscriber callback, so that VMM has the ability to reclaim memory from the guest OS and return to Chrome OS instead of being killed.

AF_INET type sockets are the only ones that need to be supported. As a result, no VPN connections outside the guest OS are allowed. For full support of the guest network, raw socket support is required.

No API to hook USB device connections needs to be provided; no USB device interception and binding to the Virtual Machine is allowed. Support for USB device recognition and passing into VM is required to implement USB support.

Inter-process communication between NaCl processes is difficult—only sockets are supported as a universal communication method.

Shared memory does not need to be supported. It is required to share video memory between the GUI component and the VMM itself, as well as for quick inter-process communications.

No CPUID support (NaCl verifier does not allow the CPUID instruction), but a VM requires it to verify supported features.

The above limitations may be resolved by tunneling in order to be able to run virtual machines.

Other requirements may be implemented for MAC AppStore applications.

The safe tunnels can be used, for example, by AV modules for isolation of harmful applications in a virtual context and for launching of the drivers in an isolated virtual environment.

The virtualization requires a kernel driver or OS kernel part for applications supporting virtual contexts to launch unsafe code natively. However, the kernel driver cannot translate all application calls to the system level, because some combinations of the system calls can be unsafe for system operation and can compromise the integrity of a protected data. In order to solve this problem, the drivers supporting hardware virtualization (that cannot be included into an application) are placed into the kernel. The drivers can have configuration settings or several drivers can be used, so each driver translates only a certain set of instructions. The thin hypervisor can be implemented (conceptually) as a driver or it can be implemented as part of the host OS (i.e., works at kernel space level with 0 ring privileges for IA-32/IA-32e or super user for ARM, etc.).

In one embodiment, the drivers control a table of virtualization instructions. Such tables have fields that can be modified only at a privileged access level. The driver is implemented at the OS level. The driver supports operations with the table regardless of the context executed by the processor. The context does not have any direct access to the table. The driver determines the fields of the table that can be used from the application. Since the application does not have access to the fields, the driver provides an API and read/write access to the virtualization table field. For example, a set of safe fields can be pre-determined. An additional field makes the set unsafe.

Basic processor unsafe instruction execution in non-root mode is controlled by Virtual Machine Control Structure (VMCS) in case of Intel VT-x, and by Virtual Machine Control Block (VMCB) for in case of AMD AMD-V, and by Virtualization Extensions in case of ARM architecture compliant processors. The control structure contains three parts: host, guest and control part. Through the thin hypervisor API, a user of virtualization framework has complete access to the guest part and limited access to the control part. The user operates with a low-level hardware state of guest registers located in VMCS. The thin hypervisor filters user calls to the low-level state in order to limit access to unsafe fields (i.e., host state, control structure).

A user or a special procedure can decide which privileges are granted to the application based on the selected context and the API. A certain set of privileges can produce a higher level of isolation of application or prohibit the use of other non-virtualized system functions. The truncated API interfaces into user space via the thin hypervisor (through a driver). The thin hypervisor provides the user space with an access interface to the hardware virtualization capabilities via ioctl, syscall, or VMCALL (in case of a host OS working in unprivileged environment). On OS X the thin hypervisor is called by using Mac OS X IOKit IOConnectCallXXX, IOConnectTrapXXX or system call mechanism.

Those skilled in the art will appreciate that very small amount of code (API) is used in the kernel driver. This code is safe and can filter the unsafe fields. This API does not compromise safety of the entire host. The user does not have access to states which can harm the host or host OS state. Instead, the safe driver (hypervisor) performs the access. Accordingly, the application is given hardware virtualization capabilities and unsafe code or system guest code can be executed inside the virtual context. The unsafe guest code can be a virus application, or another application that requires system privileges, or a complex guest operating system running in isolated non-root mode under thin hypervisor control.

The OS has kernel control structures VMCS/VMCB. The objects of this structure reside in the OS kernel and have the instructions that affect safety. Thus, a user cannot be given an ultimate control over these instructions. The thin hypervisor configures the host fields and does not allow for modifying them. In one embodiment, each application or a set of applications can be provided with different virtual machines using hardware virtualization. Thus, the application can call its own VM, but not the other VMs. In other words, the applications run in isolated contexts, and the operating system schedules applications run times. Meanwhile, the virtualization is controlled by user applications independently in a mutually safe mode. The applications do not "know" who uses what VM and cannot enter into another context because the host portion of the fields in the driver is controlled by the driver. The driver determines VMEXIT handler entry point, determine processor state when returns back from non-root guest code mode to root thin hypervisor mode. The host writes these addresses and states into correspondent fields of host part of VMCS/VMCB, but hypervisor settings do not allow access to the fields by the applications.

The registers of the processor are controlled in the same way. Also, the user application cannot use several VMs, which can be possible without an isolated application. In one embodiment, some fields can be modified in bits. Some fields can be filled with system data, but in an isolated context. For example, a user can do whatever he wants inside the context, but without exiting the context. In one embodiment, the user is given a driver for modifying the system context inside the context, because the Mac App Store does not give such privileges to applications sold through it. In other words, a user is given an API for the system configuration, but without an access to the kernel space. The thin hypervisor performs translation into the kernel space based on pre-set safety rules.

VMEXIT is an operation switching processor from a non-root mode into a root mode, which may have additional arguments indicating a cause of switching to the thin hypervisor from the guest code. The argument may be implemented in form of comments or as an additional argument, otherwise unused or in some other form, for example, nested_vmx_vmexit(vcpu, to_vmx(vcpu)->exit_reason, vmcs_read32(VM_EXIT_INTR_INFO), vmcs_read1(EXIT_QUALIFICATION)) The VMEXIT arguments corresponding to the exit code are read into the thin hypervisor without exiting into the user space. The guest state can be pre-fetched (based on previous states or empirically) in order to optimize a number of switches to the user space. According to the exemplary embodiment, special configuration fields for exit events from the root mode and from the VM are allocated.

A guest non-root state is reflected by values of a segment and control registers including states of the registers before and after exiting into the virtual context. Each context can have a limited set of hardware functions that are allowed to be accessed. For example, the context for multi-media applications can provide access to reading the disk at a block level for optimizing read speed. Also, the context can provide access to hardware decoding of the context. Meanwhile, another safe context is responsible for populating the disk in order to protect the file system.

According to the exemplary embodiment, the thin hypervisor supports a minimal required interface for access and control of hardware acceleration. Most of the control is based on one to one access correspondence to the guest state stored in VMCS, access to registers' state that are not a part of the VMCS (i.e., GPRs, FPU/XMM/YMM, MSRs, etc.). Since the nested paging (EPT and RVI) control mapping of guest physical addresses into real physical addresses at the physical page level, the virtual memory portions (guest memory) need to be locked in the OS kernel upon being placed into hardware structures of the nested paging.

The thin hypervisor manages correspondence of the virtual user space areas and the guest physical areas and locks the guest pages in a lazy mode as they are being accessed in the guest memory. The basic thin hypervisor does not deal with virtualization of any devices except for CPU and memory. However, the extended version of the hypervisor can have virtual local Advance Programmable Interrupt Controller (APIC).

According to the exemplary embodiment, nested paging is in order to simplify translation of the guest addresses into the real physical addresses. Intersection of the real address spaces is prohibited and a context-dependent swapping can be implemented in a safe mode. The EPT tables can be used accordingly—a user is given access to a system address space, but user access to other contexts is limited. This allows for using a minimal amount of code and provides for better virtualization.

The exemplary embodiment can be used with devices when user applications have limited access to the kernel space and to the physical resources, but the usability of the application can be improved significantly. For example, it can be used when implementing a hardware support of executable functions such as audio, coding/decoding, data compression, image processing, etc.

If an application does not work without hardware support and the hardware support can only be turned on upon exiting the application, the application selects a special driver, which provides for safety and turns on the hardware support for required functionality. Meanwhile, the other drivers and unsafe functions become inaccessible. In one embodiment, each driver can have a set of incompatible drivers that cannot be activated together for the same context. The system can work in one-directional mode when an application with a driver are moved into the context and reside there for a long time (until it crashes).

According to the exemplary embodiment, non-root contexts created by the thin hypervisor can be used not only for full virtualization of a computer system (i.e., CPU, memory, devices), but also for isolation of potentially unsafe applications and drivers. An execution context is created for the unsafe applications and drivers where any calls outside the context cause VMEXITS and the control is switched to control user space module. An exemplary code used in the thin hypervisor is provided in Appendix i.

As discussed above, using hardware-assisted virtualization requires a privileged hypervisor module running on a ring 0 and handling virtual machine control structures (VMCS) for VMs. The privileged thin hypervisor can be implemented as a part of the OS kernel or as a separate kernel module/driver (i.e., for example, in case of Chrome OS it is a Linux kernel module). There are no other ways to get privileged ring 0 permissions. To provide an effective and controlled access to hardware-assisted processor capabilities, the exemplary embodiment employs a simple user-space native client (NaCl) virtualization library and a thin hypervisor kernel module, which provides controlled limited access to VMX capabilities, privileged guest OS registers, and guest OS memory regions for the sandboxed user-space virtualization solution.

The virtualization library calls the thin hypervisor kernel module handling and filtering accesses to privileged capabilities and allowing manipulations with the guest OS/non-root mode state only. Thus, the virtualization library is the only way to access the non-root mode, which is secure from the root mode and the privileged mode perspective. The kernel module is a thin intermediate privileged level module used to launch the non-root code prepared in the user-space by the proposed virtualization application.

The thin hypervisor simply bypasses the user-space requests to modify VMCS fields, but filters and controls the requests if there is a chance that they will affect or corrupt the host state. Besides the virtualization of CPU(s), the VMs come with a virtual platform (guest hardware) virtualization (e.g., a virtual network adapter, a virtual USB port, etc.). Guest hardware virtualization is implemented in the user-space Virtual Machine Monitor running in the context of the virtualization application. Because of the sandboxed environment, the guest devices virtualization can be very limited. Extending the OS API (Chrome, Apple, etc.) helps to overcome the limitations and makes it similar to VMX capabilities access.

A typical virtualization solution uses a multi-process approach and consists of at least two processes:
  a GUI intercepting user input and displaying graphics from the guest OS;
  a VM controller process running the guest OS. The VM controller process works in accordance with the host OS rules (i.e., Chrome OS, MAC, etc.) and performs the guest platform virtualization, which includes native execution of the guest OS code using the thin hypervisor and the virtual machine monitor.

According to the exemplary embodiment, the proposed solution to support virtual machines includes:
  1. Thin hypervisor—a small (less than 10 KLOC or 10,000 lines of source code) kernel module handling:
    accesses to hardware assisted virtual machine control structure (VMCS) for VMs;
    non-root mode privileged access to registers that are not a part of VMCS (FPU, MMX, XMM, YMM states);
    guest memory regions mappings for VMs (associating user-space memory pages with the guest physical pages);
    mapping guest physical pages to non-root mode by using the hardware assisted nested paging mechanism (e.g., Intel EPT);
    executing the native guest code in the non-root mode;
    handling VMEXITs and redirecting them to the user space virtualization routine.
  2. User-space virtualization library to be called from the user-space native client (NaCl) code. The virtualization library is the only way to manipulate the guest OS state in the non-root mode.
  3. User-space application emulating and virtualizing the guest OS platform behavior and using the virtualization library to execute the guest code natively in the non-root mode.

The thin hypervisor kernel module and the virtualization library can be integrated with the host OS (i.e., Chrome OS, MAC OS, etc.) to provide a common virtualization interface for the sandboxed user-space virtualization solution.

The exemplary embodiment provides a secure kernel module for hardware-assisted virtualization. The proposed solution consists of a privileged thin hypervisor and a user-space virtualization library to access virtualization functions. The privileged part must be as small and secure as possible. This means that most of the platform virtualization code (including the hardware-assisted virtualization structure logical management) is implemented as a user-space code. When the native guest code execution is required, the user-space virtualization application uses the virtualization API of the virtualization library by making a call to a corresponding private interface of the thin hypervisor kernel module.

The kernel module provides the following functionality:
VMX capabilities reporting;
Nested paging tables (EPT) maintenance to translate guest physical addresses to host addresses and vice versa;
VM CS maintenance including creating, destroying, getting and setting Virtual Machine Control Structure control fields;
Physical memory allocation for VM needs;
Access to full CPU state for guest needs.

For security reasons the kernel module restricts access to a number of critical resources, such as the physical memory or the host part of VMCS. All critical functionality is implemented inside the kernel module. The module does not obtain any real physical memory addresses from the user-space (it gets the guest physical memory addresses only). The module configures the needed VMCS registers.

According to the exemplary embodiment, the user-space virtualization application consists of GUI and VM controller processes (user-space VMM). The GUI module displays the guest OS desktop content to the user, gets the keyboard and mouse input from the user, starts the VMs and communicates with corresponding VM controller processes via the inter-process communication mechanisms or over the network.

Figure 1:
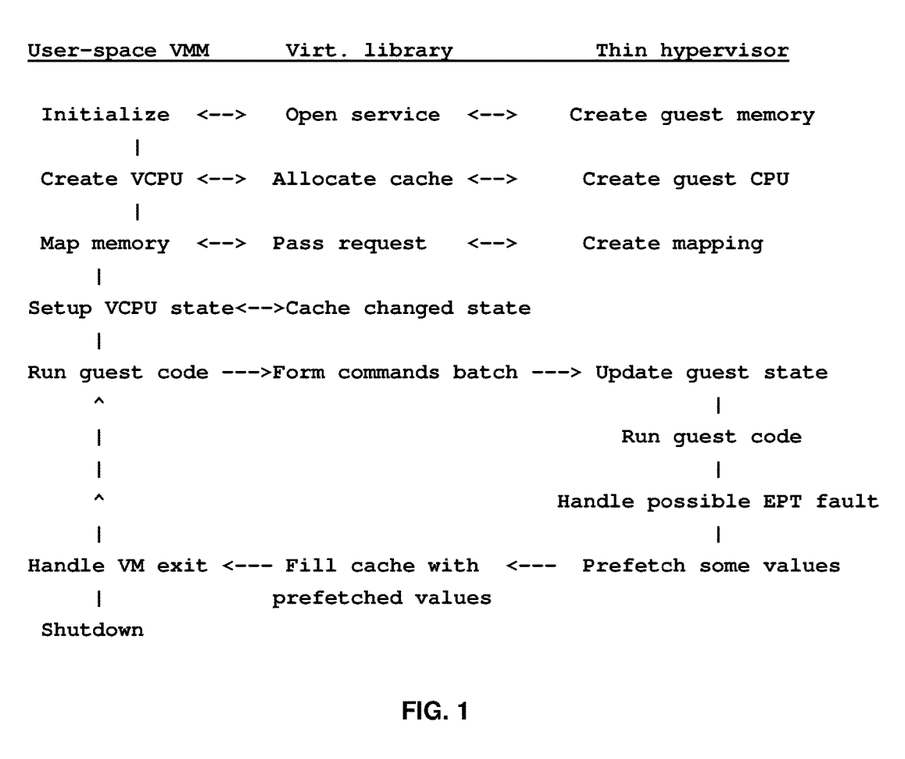
FIG. 1 illustrates a VM lifecycle, in accordance with the exemplary embodiment.

The proposed solution contains a special virtualization library. The library provides an interface to the virtualization capabilities to be used by the NaCl-based code. The interface acts as an intermediate and caching level between the virtualization application and the thin hypervisor. An exemplary VM lifecycle is depicted in FIG. 1.

Most of the virtualization library calls are simply forwarded to the kernel module. To reduce a number of user-to-kernel switches, the virtualization library has an internal cache of the virtual CPU states. Writes to VMCS fields or guest CPU registers can be delayed until the real guest code execution begins. The library can also pre-fetch some values before returning back to the caller.

The virtualization library interface has a minimal set of functions:
Creating and destroying virtual machine instances;
Mapping, un-mapping and protecting guest memory regions allocated by the user-space virtualization application;
Creating and destroying virtual CPUs;
Reading VMX capabilities;
Receiving and setting virtual CPU general purpose registers;
Getting and setting virtual FPU/MMX/XMM/YMM registers;
Reading and writing the allowed model-specific registers (MSRs);
Reading and writing the allowed VMCS fields;
Running the guest code on VCPU.

The above listed functions are sufficient to execute the guest OS code by using the thin hypervisor. The VM controller process is the user-space virtual machine monitor supporting the virtualization and platform emulation in the user-space and calling an API when necessary. One of the APIs that the user-space monitor uses is the proposed virtualization library that provides a way to launch the guest OS code natively by using the hardware assisted virtualization implemented in the thin hypervisor kernel module. A user-space VMM is a part of the virtualization application. It can be implemented as a native client (NaCl) executable binary linked with glibc.

Figure 2:
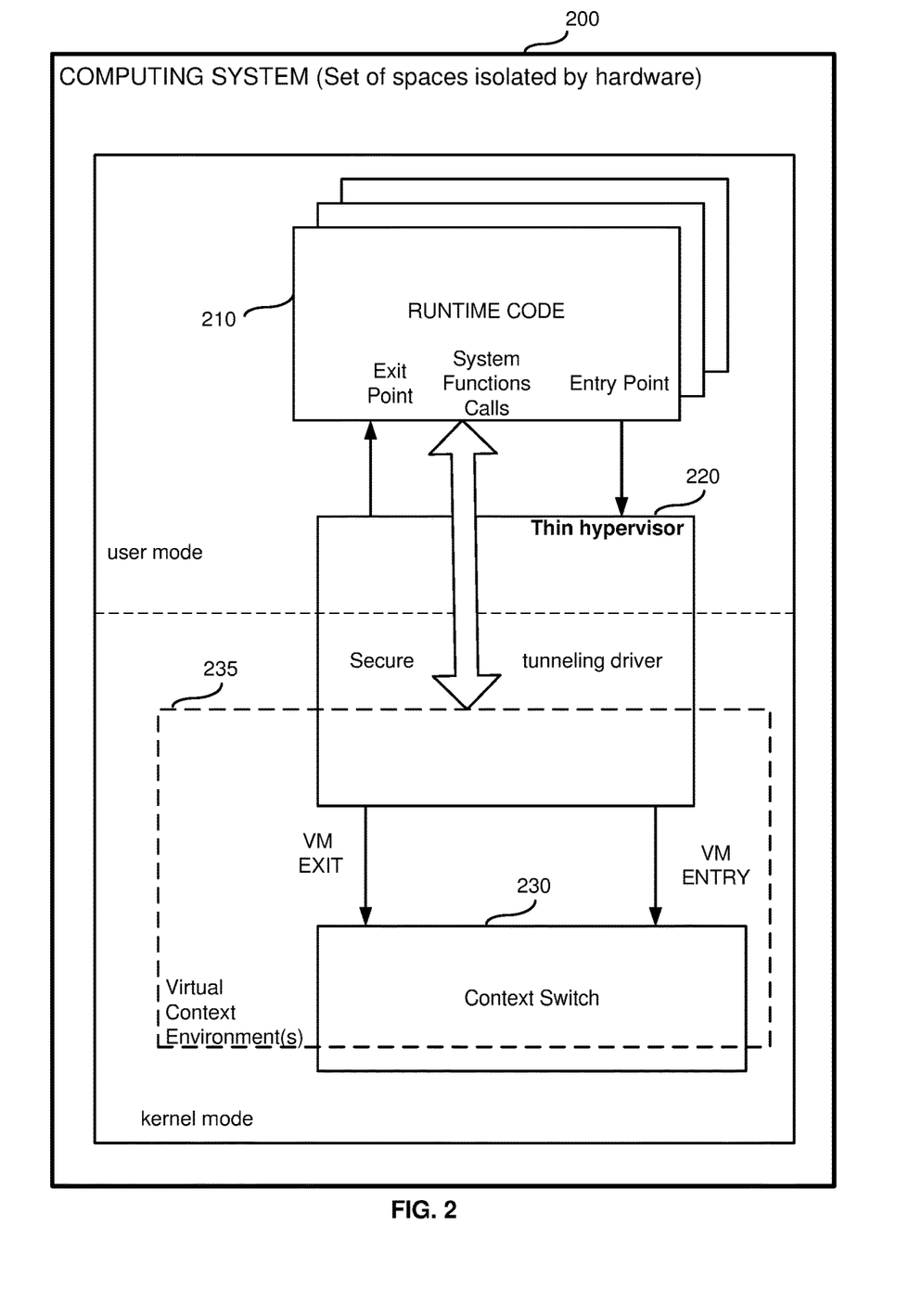
FIG. 2 illustrates and architecture of a system for using a thin hypervisor, in accordance with the exemplary embodiment.

FIG. 2 illustrates and architecture of a system for using a thin hypervisor, in accordance with the exemplary embodiment. A computer system 200 has a set of spaces isolated by hardware. A runtime code(s) 210 is executed in a user mode. A virtual context environment 235 is implemented in a kernel mode. The runtime code 210 sends system function calls to the virtual context environment(s) 235 via a thin hypervisor (using the secure tunneling) driver 220. The driver performs the required function using tunneling or bypassing, and the Hypervisor provides a secure connection via bypassing or tunneling. Both tunneled contexts cannot affect other contexts. Here one of the tunneled context may be the same as the main execution environment, but with reduced functionality, providing increased security. For example, flash memory access or sound level control functions may be restricted in execution environment without notification to the driver. The hypervisor controls VM exits and VM entries triggered by the runtime code. A context switch 230 switches between virtual context environments 235.

Figure 3:
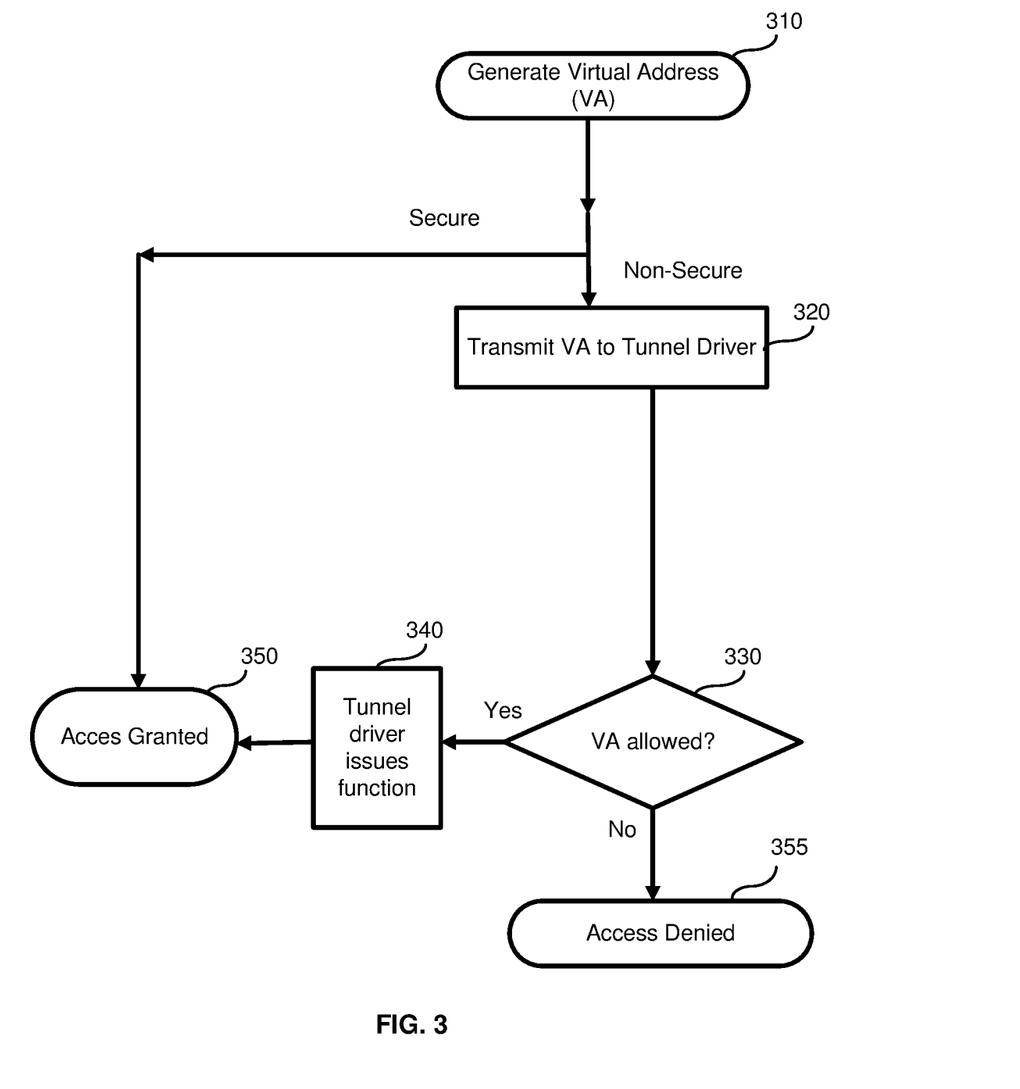
FIG. 3 illustrates a flow chart for using a secure channel, in accordance with the exemplary embodiment.

FIG. 3 illustrates a flow chart for using a secure channel, in accordance with the exemplary embodiment. A virtual address (VA) is generated by an application in step 310. If the VA address is secure, the access is granted in step 350. Otherwise, the VA is transmitted to a tunnel driver in step 320. If the VA is allowed in step 330, the tunnel driver issues a function in step 340 and access is granted in step 350. The function can contain unsecure requests, but the environment where it is tunneled will then perform only those actions allowed by the Hypervisor. Otherwise, the access is denied in step 355.

Figure 4:
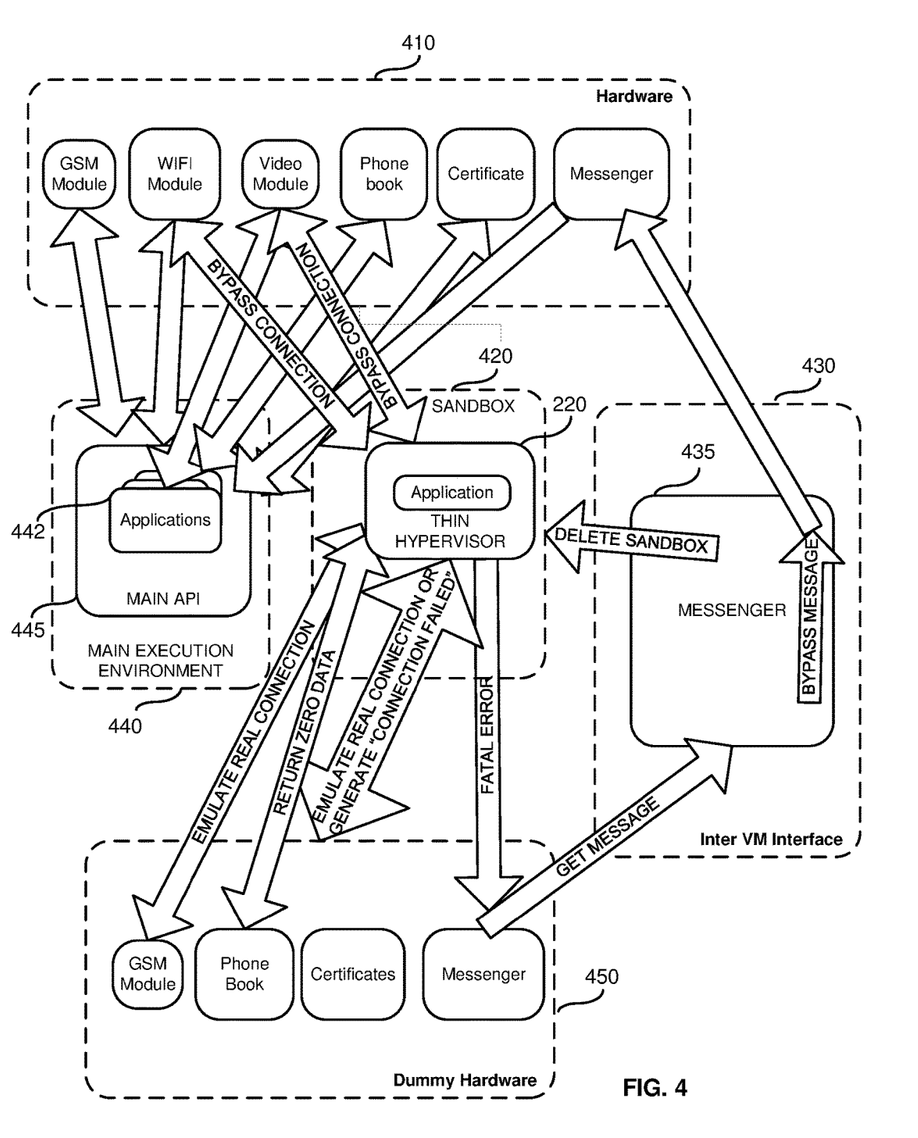
FIG. 4 illustrates a workflow of a system using a thin hypervisor in accordance with the exemplary embodiment.

FIG. 4 illustrates a workflow of a system using a thin hypervisor in accordance with the exemplary embodiment. A sandbox 420 has a thin hypervisor 220 implemented on it. Applications 442 run within a main execution environment 445. The applications 442 communicate with hardware devices 410 using a main API 445. In case if the hardware device is not available to the application 442, the emulated (dummy) hardware 450 is used via inter VM interface 435.

Figure 5:
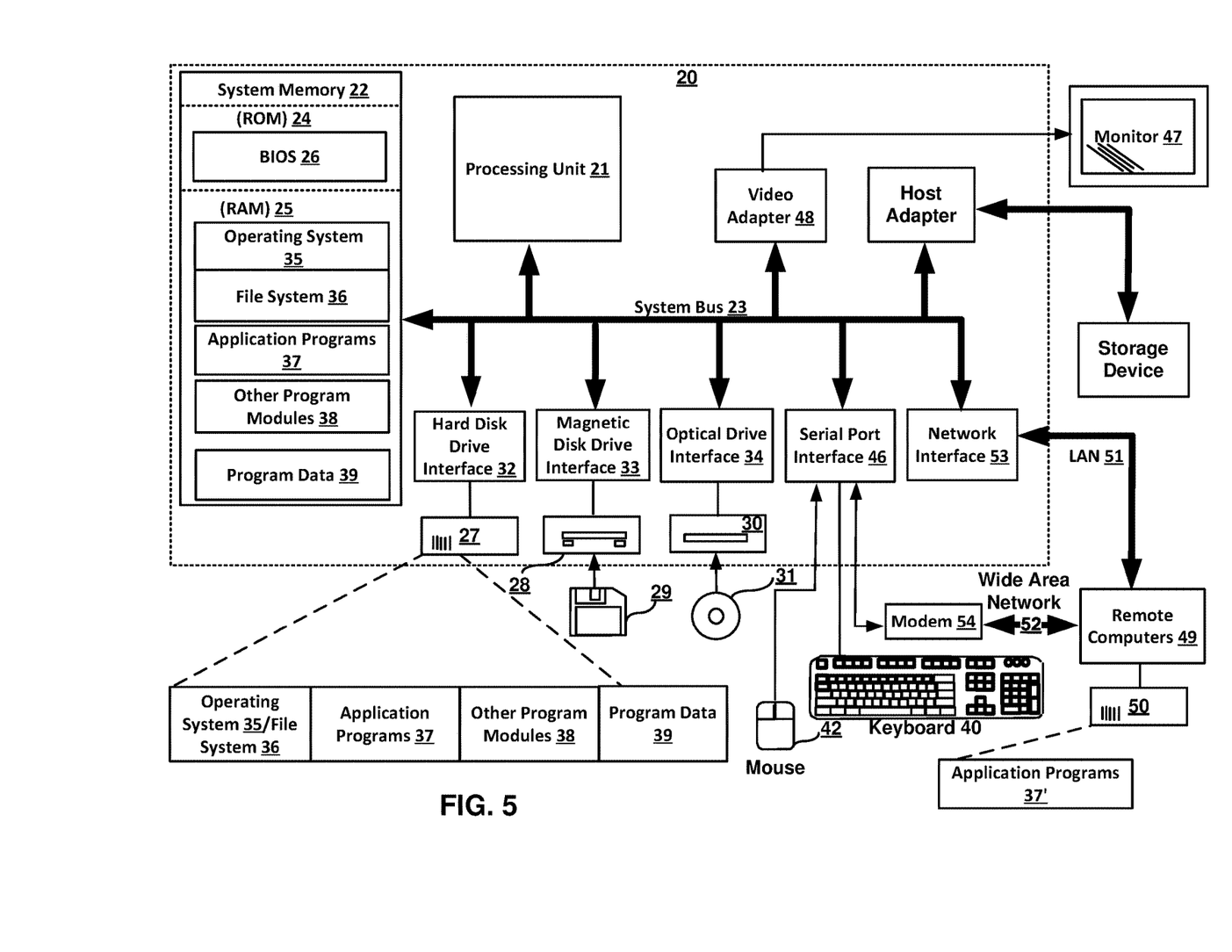
FIG. 5 illustrates an exemplary computer system where the embodiments described herein can be implemented.

With reference to FIG. 5, an exemplary system for implementing the invention includes a general purpose computing device in the form of a host computer 200 or the like, including a processing unit (single core or multi-core) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer/server 200 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 200.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 200 includes a file system 36 associated with or included within the operating system 35, one or more application programs 37, 37', other program modules 38 and program data 39. A user may enter commands and information into the computer 200 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 200 may operate in a networked environment using logical connections to one or more remote computers 49. The remote computer (or computers) 49 may be another computer, a server, a router, a network PC, a peer device or other common network node, and typically includes many or all of the elements described above relative to the computer 200, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 200 is connected to the local network 51 through a network interface or adapter 53. When used in a WAN networking environment, the computer 200 typically includes a modem 54 or other means for establishing communications over the wide area network 52, such as the Internet. The modem 54, which may be internal or external, is connected to the system bus 23 via the serial port interface 46.

In a networked environment, program modules depicted relative to the computer 200, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

APPENDIX I

```
// Input/output argument structures for synchronous calls of
IOConnectCallMethod/ioctl/sysctl interface
struct VmmCreateCpuInfo {
   vcpu_t vcpuIndex;
   uint64_t flags;
};
struct VmmDestroyCpuInfo {
   vcpu_t vcpuIndex;
};
struct VmmMapUnmapInfo {
   uint64_t virtualAddress;
   uint64_t guestPhysicalAddress;
   uint64_t length;
   uint64_t flags;
};
struct VmmProtectInfo {
   uint64_t guestPhysicalAddress;
   uint64_t length;
   uint64_t flags;
};
struct VmmGetDirtyInfo {
   uint64_t guestPhysicalAddress;
   uint64_t length;
};
struct VmmCpuCapabilityInfo {
   vcpu_t vcpuIndex;
   uint32_t capability;
};
struct VmmCpuEnableMsrInfo {
   vcpu_t vcpuIndex;
   uint32_t msrNumber;
   boolean_t enable;
};
// VMM_CPU_CONTROL commands identifiers
#define VMM_X86_GET_REGISTER
   M(MH_GET_REGISTER) // {cmd id; reg no}
#define VMM_X86_SET_REGISTER
   M(MH_SET_REGISTER) // {cmd id; reg no; value}
#define VMM_X86_READ_VMCS
   M(MH_READ_VMCS) // {cmd id; field no}
#define VMM_X86_WRITE_VMCS
   M(MH_WRITE_VMCS) // {cmd id; field no; value}
#define VMM_X86_GET_FPSTATE512
   M(MH_GET_FPSTATE512)// {cmd id}
#define VMM_X86_SET_FPSTATE512
   M(MH_SET_FPSTATE512) // {cmd id; 512 bytes FPU state}
#define VMM_X86_GET_MSR
   M(MH_GET_MSR) // {cmd id; msr no}
#define VMM_X86_SET_MSR
   M(MH_SET_MSR) // {cmd id; msr no; value}
#define VMM_X86_GET_GUEST_TIME
```

```
M(MH_GET_GUEST_TIME) // {cmd id; guest time
   value}
#define VMM_X86_RUN
   M(MH_RUN) // {cmd id}
struct VmmCpuCmdBuffer {
   vcpu_t vcpuIndex;
   uint64_t cmdBuffer[ ]; // list of commands based on
VMM_X86_XXX commands
};
// IOConnectCallMethod/ioctl/sysctl interface
enum {
   // Create VCPU instance
   // [in] structure VmmCreateCpuInfo: VCPU index; addi-
tional VCPU flags
   // [out] error code
   VMM_CPU_CREATE,
   // Destroy VCPU
   // [in] structure VmmDestroyCpuInfo: VCPU index
   // [out] error code
   VMM_CPU_DESTROY,
   // Interrupt selective VCPUs native execution (generate
synthetic VMExit from non-root mode)
   // [in] (vcpu_t[ ]) VCPUs index array
   // [out] error code
   VMM_CPU INTERRUPT,
   // Associate user space buffer with guest physical memory
range and protect the range in accordance to access flags
   // [in] structure VmmMapUnmapInfo: user space buffer
virtual address; guest physical address; memory range size;
access   flags   (VMM_MEMORY_READ|WRITE|EX-
ECUTE)
   // [out] error code
   VMM_MAP,
   // Remove guest physical memory region ties to user
space buffers
   // [in] structure VmmMapUnmapInfo: guest physical
      address; memory range size
   // [out] error code
   VMM_UNMAP,
   // Change protection for guest physical memory range in
      accordance to new access flags
   // [in] structure VmmProtectInfo: guest physical address;
      memory range size; access flags (VMM_MEMO-
      RY_READ|WRITE|EXECUTE)
   // [out] error code
   VMM_PROTECT,
   // Get modified pages for the guest physical memory
      range since previous getting dirty pages.
   // (Dirty bits are cleared in EPT entries to mark that the
      dirty status has already gotten.)
   // (This is optional interface for hardware supporting EPT
      dirty bits, for usage need check capability.)
   // [in] structure VmmGetDirtyInfo: guest physical
      address; memory range size
   // [out] error code; (void*) copied dirty bit array
   VMM_GET_DIRTY,
   //
   // Reserved for arch independent controls
   //
   // Get hardware feature list available to be configured by
      user
   // [in] structure VmmCpuCapabilityInfo: VCPU index;
      capability    number    (CAP_VMX_PINBASED,
      CAP_VMX_PROCBASED,         CAP_VMX-
      _PROCBASED2)
   // [out] error code; (uint64_t) capability bit mask which
      are available for user configuration
   VMM_CPU_X86_GET_CAPABILITY=ARCH_DEP_NO,
   // Enable/disable native access to selective MSR
   // [in] structure VmmCpuEnableMsrInfo: VCPU index;
      MSR number; native access flags
   // [out] error code
   VMM_CPU_X86_ENABLE_MSR_NATIVE,
   // Command queue based control interface to read/write
      VCPU relevant state and to launch guest code in
      hardware assisted non-root mode.
   // Command queues are used to avoid excessive user-
      kernel switches to update modified state changed dur-
      ing user space emulation
   // and prefetch state changed during native execution.
   // [in] structure VmmCpuCmdBuffer: VCPU index; input
      command queue with registers, FPU, and VMCS fields
      numbers, and VMM_X86_RUN command
   // [out] error code; structure VmmCpuCmdBuffer: output
      command queue with gotten values
   VMM_CPU_X86 CONTROL,
};
typedef uint32_t vmid_t;
typedef uint32_t vcpu_t;
typedef int vmerr_t;
// Create VMM instance, open VMM kernel service
   connection
   vmerr_t vmm_create(vmid_t *vmid, uint64_t flags);
// Close VMM service connection
   vmerr_t vmm_destroy(vmid_t vmid);
// Create VCPU instance
   vmerr_t vmm_create_vcpu(vmid_t vmid, vcpu_t *vcpu,
uint64_t flags);
// Destroy VCPU
   vmerr_t vmm_destroy_vcpu(vmid_t vmid, vcpu_t vcpu);
// Memory protection flags for vmm_map( ) and vmm-
_protect( ) routine
   enum {
   VMM_MEMORY_READ=(1u<<0),
   VMM_MEMORY WRITE=(1u<<1),
   VMM_MEMORY EXECUTE=(1u<<2),
};
// Associate user space buffer with guest physical memory
range
   vmerr_t vmm_map(vmid_t vmid, const void *va,
uint64_t gpa, size_t size, uint64_t flags);
// Remove guest physical memory region ties to user
space buffers
   vmerr_t vmm_unmap(vmid_t vmid, uint64_t gpa, size_t
size);
// Protect/unprotect guest physical memory region
   vmerr_t vmm_protect(vmid_t vmid, uint64_t gpa, size_t
size, uint64_t flags);
// [optional] Will read dirty bits if there is correspondent
capability (EPT dirty bits support in hardware)
   vmerr_t vmm_get_dirty(vmid_t vmid, uint64_t gpa,
size_t size, void *dirty bits);
// Read register from the cached state or make sync call to
kext in cache miss case
   vmerr_t vcpu_read_register(vmid_t vmid, vcpu_t vcpu,
uint32_t r, uint64_t *value);
// Write register to the cache, will be flushed to kext on
vcpu_run( ) or by synchronious vcpu_flush( )
   vmerr_t vcpu_write_register(vmid_t vmid, vcpu_t vcpu,
uint32_t r, uint64_t value);
// Read VMCS field from the cached state or make sync
call to kext in cache miss case
   vmerr_t vcpu_read_vmcs(vmid_t vmid, vcpu_t vcpu,
uint32_t r, uint64_t *value);
```

```
// Write VMCS field to the cache, will be flushed to kext
on vcpu_run( ) or by synchronious vcpu_flush( )
// (VMCS fields content will be filtered in the kext
additionally to avoid prohibited state manipulation)
    vmerr_t vcpu_write_vmcs(vmid_t vmid, vcpu_t vcpu,
uint32_t r, uint64_t value);
// Read FPU registers from the cached state or make sync
call to kext in cache miss case
    vmerr_t vcpu_read_fpstate(vmid_t vmid, vcpu_t vcpu,
void *buffer, size_t size);
// Write FPU registers to the cache, will be flushed to kext
on vcpu_run( ) or by synchronious vcpu_flush( )
    vmerr_t vcpu_write_fpstate(vmid_t vmid, vcpu_t vcpu,
const void *buffer, size_t size);
// Read MSR register from the cached state or make sync
call to kext in cache miss case
    vmerr_t vcpu_read_msr(vmid_t vmid, vcpu_t vcpu,
uint32_t r, uint64_t *value);
// Write MSR register to the cache, will be flushed to kext
on vcpu_run( ) or by synchronious vcpu_flush( )
    vmerr_t vcpu_write_msr(vmid_t vmid, vcpu_t vcpu,
uint32_t r, uint64_t value);
// Capability type identifier for vcpu_read_capability( )
    enum {CAP_VMX_PINBASED, CAP_VMX-
_PROCBASED, CAP_VMX_PROCBASED2};
// Get hardware feature list available for user configura-
tion
    vmerr_t vcpu_read_capability(vmid_t vmid, vcpu_t vcpu,
uint32_t cap, uint64_t *value);
// Enable or disable native access to MSR register from
hardware assisted non-root mode
// (Allow native access manipulation for limited MSR set
only controlled by the kext)
    vmerr_t vcpu_enable_msr_native(vmid_t vmid, vcpu_t
vcpu, uint32_t r, boolean_t enable);
// Get time of the last guest native execution (in nano-
seconds)
    vmerr_t vcpu_get_guest_time(vmid_t vmid, vcpu_t vcpu,
uint64_t *time);
// Flush updated VCPU state from the cache to hardware
structures, run guest code native execution in non-root
mode, prefetch selective VCPU state
// (Do synchronous VMM_CPU_X86_CONTROL call to
the kext.)
    vmerr_t vcpu_run(vmid_t vmid, vcpu_t vcpu);
// Interrupt selective VCPUs native execution to generate
VMExit and exit to user space completing vcpu_run( )
    vmerr_t vcpu_interrupt(vmid_t vmid, vcpu_t* vcpus,
size_t vcpu count);
// Flush updated VCPU state (registers, VMCS fields,
MSRs) from library cache to hardware structures in kernel
    vmerr_t vcpu_flush(vmid_t vmid, vcpu_t vcpu);
// end
```

What is claimed is:

1. A system for native execution of unsafe code, the system comprising:
 a Virtual Machine (VM) under control of a user-space Virtual Machine Monitor (VMM) and running on a host system;
 a Guest OS running in the VM;
 a Guest application executed under the Guest OS;
 a thin hypervisor acting as an intermediate layer between the Guest application and the user-space VMM, wherein the thin hypervisor is a separate component from the VM, wherein:
 the thin hypervisor is configured to intercept a Virtual Machine Exit event generated by the Guest application;
 the thin hypervisor includes a secure tunnel configured to filter virtual memory addresses; and
 the thin hypervisor analyzes requests from the user-space VMM to modify guest context fields of VMCS (Virtual Machine Control Structure), VMCB (Virtual Machine Control Block) or Virtualization Extensions, and gives the user-space VMM access to the guest context fields using a virtualization library that resides in user space of the host system, so as to manage an environment of the VM.

2. The system of claim 1, wherein the thin hypervisor includes a secure tunnel driver.

3. The system of claim 1, wherein the virtualization library is an application programming interface.

4. The system of claim 1, wherein the thin hypervisor translates Guest memory page addresses into physical memory addresses.

5. The system of claim 4, wherein the thin hypervisor controls memory using nested paging.

6. The system of claim 1, wherein the user space has a limited set of allowed interfaces and addition of an extra interface indicates a presence of the unsafe code.

7. The system of claim 1, wherein a kernel space in which the thin hypervisor is implemented has an extra interface indicates a presence of the unsafe code.

8. The system of claim 1, wherein an unsafe application is executed in the sandbox, the sandbox being configured to emulate a system interface and a user interface.

9. The system of claim 8, wherein safe user interfaces are pushed into a user space.

10. The system of claim 1, wherein the thin hypervisor is implemented in microcode.

11. The system of claim 1, wherein the thin hypervisor is defined by a context identifier.

12. The system of claim 1, wherein the thin hypervisor is defined by a table containing available address ranges.

13. The system of claim 12, wherein the thin hypervisor is defined by allowed operations for certain address ranges and by allowed argument values that can be written into registers at the context addresses.

14. The system of claim 1, wherein the virtualization library executes any of:
 creating and destroying virtual machine instances;
 mapping, un-mapping and protecting guest memory regions allocated by a user-space virtualization application;
 creating and deleting Virtual CPUs;
 reading VMX (Virtual Machine Extension) capabilities;
 receiving and setting virtual CPU general purpose registers;
 getting and setting virtual FPU (Floating Point Unit)/ MMX (Matrix Math Extensions)/XMM/YMM registers;
 reading and writing allowed model-specific registers (MSRs);
 reading and writing allowed guest context fields of the VMCS/VMCB/Virtualization Extensions so as to give the user-space VMM access to the guest context fields using a virtualization library that resides in user space of the host system, in order to manage an environment of the VM; and
 running guest code on the Virtual CPUs.

15. The system of claim 1, wherein the thin hypervisor filters the Guest application instructions in order to protect integrity of the host system.

16. A computer-implemented method for native execution of unsafe code, the method comprising:

launching a Virtual Machine (VM) on a host system and under control of a user-space Virtual Machine Monitor (VMM);

instantiating a Guest Operating System (OS) running on the VM;

starting a Guest application on the Guest OS;

activating a thin hypervisor in a kernel space, wherein the thin hypervisor is a separate component from the VM;

controlling the Guest application by the thin hypervisor that acts as an intermediate layer between the Guest application and the user-space VMM;

intercepting a Virtual Machine Exit event caused by an instruction of the Guest application;

creating a secure tunnel configured to filter virtual memory addresses of the instructions;

filtering the instructions of the Guest application;

analyzing requests from the user-space VMM to modify guest context fields of VMCS (Virtual Machine Control Structure), VMCB (Virtual Machine Control Block) or Virtualization Extensions so as to give the user-space VMM access to the guest context fields using a virtualization library that resides in user space of the host system, in order to manage an environment of the VM; and emulating system instructions without execution.

17. The method of claim 16, further comprising analyzing for presence of a virus at an address of an exception generation.

18. The method of claim 16, further comprising implementing the thin hypervisor in a super user space.

19. A computer program product comprising a non-transitory computer-readable medium storing instructions for performing the steps of:

launching a Virtual Machine (VM) on a host system and under control of a user-space Virtual Machine Monitor (VMM);

instantiating a Guest Operating System (OS) running on the VM;

starting a Guest application on the Guest OS, wherein the thin hypervisor is a separate component from the VM;

activating a thin hypervisor in a kernel space;

controlling the Guest application by the thin hypervisor that acts as an intermediate layer between the Guest application and the user-space VMM;

intercepting a Virtual Machine Exit event caused by an instruction of the Guest application;

creating a secure tunnel configured to filter virtual memory addresses of the instructions;

filtering the instructions of the Guest application;

analyzing requests from the user-space VMM to modify guest context fields of VMCS (Virtual Machine Control Structure), VMCB (Virtual Machine Control Block) or Virtualization Extensions so as to give the user-space VMM access to the guest context fields using a virtualization library that resides in user space of the host system, in order to manage an environment of the VM; and emulating system instructions without execution.

* * * * *